United States Patent
Maeda

(10) Patent No.: US 11,640,246 B2
(45) Date of Patent: May 2, 2023

(54) INFORMATION PROCESSING DEVICE, CONTROL METHOD, AND COMPUTER-READABLE RECORDING MEDIUM STORING CONTROL PROGRAM

(71) Applicant: FUJITSU LIMITED, Kawasaki (JP)

(72) Inventor: Munenori Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 17/480,172

(22) Filed: Sep. 21, 2021

(65) Prior Publication Data

US 2022/0221991 A1 Jul. 14, 2022

(30) Foreign Application Priority Data

Jan. 8, 2021 (JP) .............................. JP2021-002051

(51) Int. Cl.
*G06F 3/06* (2006.01)
(52) U.S. Cl.
CPC .......... *G06F 3/0613* (2013.01); *G06F 3/0604* (2013.01); *G06F 3/067* (2013.01); *G06F 3/0653* (2013.01); *G06F 3/0659* (2013.01)
(58) Field of Classification Search
CPC .... G06F 3/0613; G06F 3/0604; G06F 3/0653; G06F 3/0659; G06F 3/067; G06F 9/461; G06F 9/4812; G06F 9/4843; G06F 9/4806
See application file for complete search history.

(56) References Cited

U.S. PATENT DOCUMENTS 6,754,736 B1 6/2004 Ogawa et al.
11,144,481 B2 * 10/2021 Adavi .................... G06F 3/061
2013/0024875 A1 * 1/2013 Wang ..................... G06F 9/542
  719/318
2017/0336988 A1 * 11/2017 Kim ...................... G06F 3/0685
2018/0300140 A1 10/2018 Maeda

FOREIGN PATENT DOCUMENTS

JP 2001-005767 A 1/2001
JP 2018-180985 A 11/2018

OTHER PUBLICATIONS

M. Tan, B. Liu, S. Dai and Z. Zhang, "Multithreaded pipeline synthesis for data-parallel kernels," 2014 IEEE/ACM International Conference on Computer-Aided Design (ICCAD), 2014, pp. 718-725, doi: 10.1109/ICCAD.2014.7001431. (Year: 2014).*
Nvmexpress.org, "NVM-Express-1.4- Ratified", https://nvmexpress.org/changes-in-nvm-express-revision-2-0 (Year: 2020).*

* cited by examiner

*Primary Examiner* — Khoa D Doan
(74) *Attorney, Agent, or Firm* — Fujitsu Patent Center

(57) ABSTRACT

An information processing device includes: a request queue that stores a request for IO processing; a response queue that stores a response that makes notification of completion of the IO processing; an IO device that obtains the request from the request queue, executes the IO processing instructed by the obtained request, and stores the response in the response queue after the completion of the IO processing; a first processing unit that writes a request to the request queue after saving context that is information that indicates an operation state of the first processing unit; and a second processing unit that polls the response queue, detects storage of the response in the response queue, obtains the response from the response queue, and notifies the first processing unit of the completion of the IO processing.

9 Claims, 11 Drawing Sheets

INFORMATION PROCESSING DEVICE, CONTROL METHOD, AND COMPUTER-READABLE RECORDING MEDIUM STORING CONTROL PROGRAM

CROSS-REFERENCE TO RELATED APPLICATION

This application is based upon and claims the benefit of priority of the prior Japanese Patent Application No. 2021-2051, filed on Jan. 8, 2021, the entire contents of which are incorporated herein by reference.

FIELD

The embodiments discussed herein are related to an information processing device, a control method, and a control program.

BACKGROUND

High performance is an important value for enterprise servers, which are servers for large enterprises. Therefore, enterprise servers are expected to bring out the performance of high-speed I/O devices for high-speed input/output (I/O), such as communication devices and storage, to the utmost limit of hardware performance. Examples of a typical high-speed I/O device include InfiniBand, non-volatile memory express (NVMe), Intel (registered trademark) I/O Acceleration Technology (I/OAT), and Intel QuickAssist Technology (QAT).

A high-speed I/O device generally has a request queue and a response queue. The request queue is a buffer that stores an I/O request as a request. The response queue is a buffer that stores a response to each request. The request queue and the response queue have several configurations such as a combination of a core-specific request queue and a core-specific response queue, and a combination of a core-specific request queue and an inter-core supply response queue. Here, the combination of the request queue and the response queue is not particularly limited.

In addition, as technology for bringing out the hardware performance of the high-speed I/O device, technology called the kernel bypass technology, which reduces the intervention of an operating system (OS), is considered to be promising. In the conventional kernel bypass technology, synchronous I/O processing in an application layer is common. For example, according to the kernel bypass technology, a thread that has performed an I/O operation, such as writing to storage, suspends and waits until the I/O processing is complete, and returns and resumes the processing after the I/O processing is complete. Here, a running program is called a process, and the process has one or more threads. Each thread is assigned to one of cores of a central processing unit (CPU), and is executed. For example, a thread is a part that sequentially executes commands in a process, and is a unit that uses a CPU core.

Various conventional techniques have been proposed to improve such processing of high-speed I/O devices. For example, there is a technique called I/O polling that achieves both improvement in I/O throughput and improvement in response delay time by executing writing to the request queue and polling the response queue in parallel with multiple CPUs.

There is another technology called cooperative multithreading. This technology is one of thread scheduler schemes, which is a technique of switching a thread that executes processing to another thread running at the same time by, instead of switching threads by interrupt, the thread itself passing control to a scheduler. This switching is called a context switch at times.

The context is a minimum data set to be used to stop the execution of the thread and to restart thereafter, which is information indicating a latest execution state of the CPU for the thread. In the processing of cooperative multithreading, preemption does not have to be considered, and it is limited to the data set used at the entry of a function, and thus the context is to be as follows. For example, the context in the processing of cooperative multithreading includes a stack, an instruction counter, a stack pointer, and a Callee-saved register, which is a subset of general-purpose registers defined as application binary interfaces (ABIs) for each OS. The instruction counter is information indicating an address of a memory to be executed next by the thread. Furthermore, the stack pointer is a pointer indicating a position to be used next to the processor in the stack area.

However, in a multiprocessor environment in which an I/O waiting thread and an I/O completion notification thread operate on different cores, an abnormal situation may occur. For example, the following situations may be considered. At a time point when the I/O waiting thread that has issued the I/O request writes the request to the request queue, the transmitting thread has not saved the context yet. The high-speed I/O device operates to process the I/O request, and writes completion notification in the response queue along with it. The I/O completion notification thread that makes notification of completion of I/O processing operates on a core different from that of the I/O waiting thread, and performs processing for returning the transmitting thread from a request file descriptor (fd) in the notification. At this time point, a state where the I/O waiting thread has not saved the context may be considered. In this case, context information has an invalid value, whereby the return of the I/O waiting thread fails. Thereafter, the I/O waiting thread saves the context, and shifts to a suspended state. In this case, it becomes difficult to restore the I/O waiting thread, and an abnormal situation such as a transmission completion timeout or a system deadlock occurs. In this manner, it is different to ensure reliability in the case of simply operating the I/O waiting thread and the I/O completion notification thread in different multiprocessor environments.

Several methods may be considered to avoid occurrence of such an abnormal situation. One is in-kernel execution using a system call. This is a method of executing, as a system call, processing excluding the request fd acquisition and the request fd release, which are the main parts of the processing of the I/O waiting thread, inside the kernel. With this method, the context of the I/O waiting thread is saved at the time of moving from the system call to the kernel. Therefore, no passing between the context saving and the return of the I/O waiting thread occurs. However, it is difficult to introduce the system call into the I/O processing in a case of using the kernel bypass technology in a cooperative multithreading environment.

In view of the above, in the mechanism of the kernel bypass technology, exclusive control using a lock is generally performed in a multiprocessor environment in which the I/O waiting thread and the I/O completion notification thread are different. This is a process in which the context area in the request fd is locked before the I/O waiting thread writes to the I/O request queue and the lock is released at the end of the operation of the I/O waiting thread after the context saving has been complete. More specifically, the context area is locked at the time when the I/O completion notification thread accesses the context area. In a case where locking has already been performed, the I/O waiting thread waits until the I/O completion notification is made. As a result, no passing between the context saving and the return of the I/O waiting thread occurs.

Note that the following techniques exist as a technique related to a request queue. There is a technique in which requests are read in the order of being stored in a request queue of a device, sequence numbers are sequentially assigned, a list of arranging the requests in the order of being read is created for each core, and the requests are reordered in the order of the sequence numbers and obtained to be stored in the request queue. Furthermore, there is a technique in which user requests are sequentially added to a list in user space, requests are processed by following the list in kernel space, and whether the next element in the list is valid or invalid is determined on the basis of whether the kernel space already retains information at the end of the list to execute the processing.

Examples of the related art include as follows: Japanese Laid-open Patent Publication No. 2018-180985; and Japanese Laid-open Patent Publication No. 2001-005767.

SUMMARY

According to an aspect of the embodiments, an information processing device includes: a request queue that stores a request for IO processing; a response queue that stores a response that makes notification of completion of the IO processing; an IO device that obtains the request from the request queue, executes the IO processing instructed by the obtained request, and stores the response in the response queue after the completion of the IO processing; a first processing unit that writes a request to the request queue after saving context that is information that indicates an operation state of the first processing unit; and a second processing unit that polls the response queue, detects storage of the response in the response queue, obtains the response from the response queue, and notifies the first processing unit of the completion of the IO processing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, in the case of locking the context area, the I/O waiting thread waits during that time, whereby a delay time of the I/O processing increases and the performance deteriorates. In the first place, the exclusive control serializes memory transactions by atomic instructions, whereby processing may be heavy and I/O processing may be delayed, which may deteriorate the performance of the I/O processing. For example, a delay of several tens of microseconds may occur in the case of performing the exclusive control.

Furthermore, in the technique of storing, in the request queue, the requests to which the sequence numbers are assigned in the order of being read according to the list and in the technique of performing processing according to the order of user requests, the storage timing of the context is not considered. Therefore, it is difficult to reduce abnormality occurrence such as deadlock, and it is difficult to ensure reliability.

The disclosed technique has been conceived in view of the above, and aims to provide an information processing device, a control method, and a control program capable of improving performance of I/O processing while ensuring reliability.

Hereinafter, embodiments of an information processing device, a control method, and a control program disclosed in the present application will be described in detail with reference to the drawings. Note that the following embodiments do not limit the information processing device, the control method, and the control program disclosed in the present application.

First Embodiment

Figure 1:
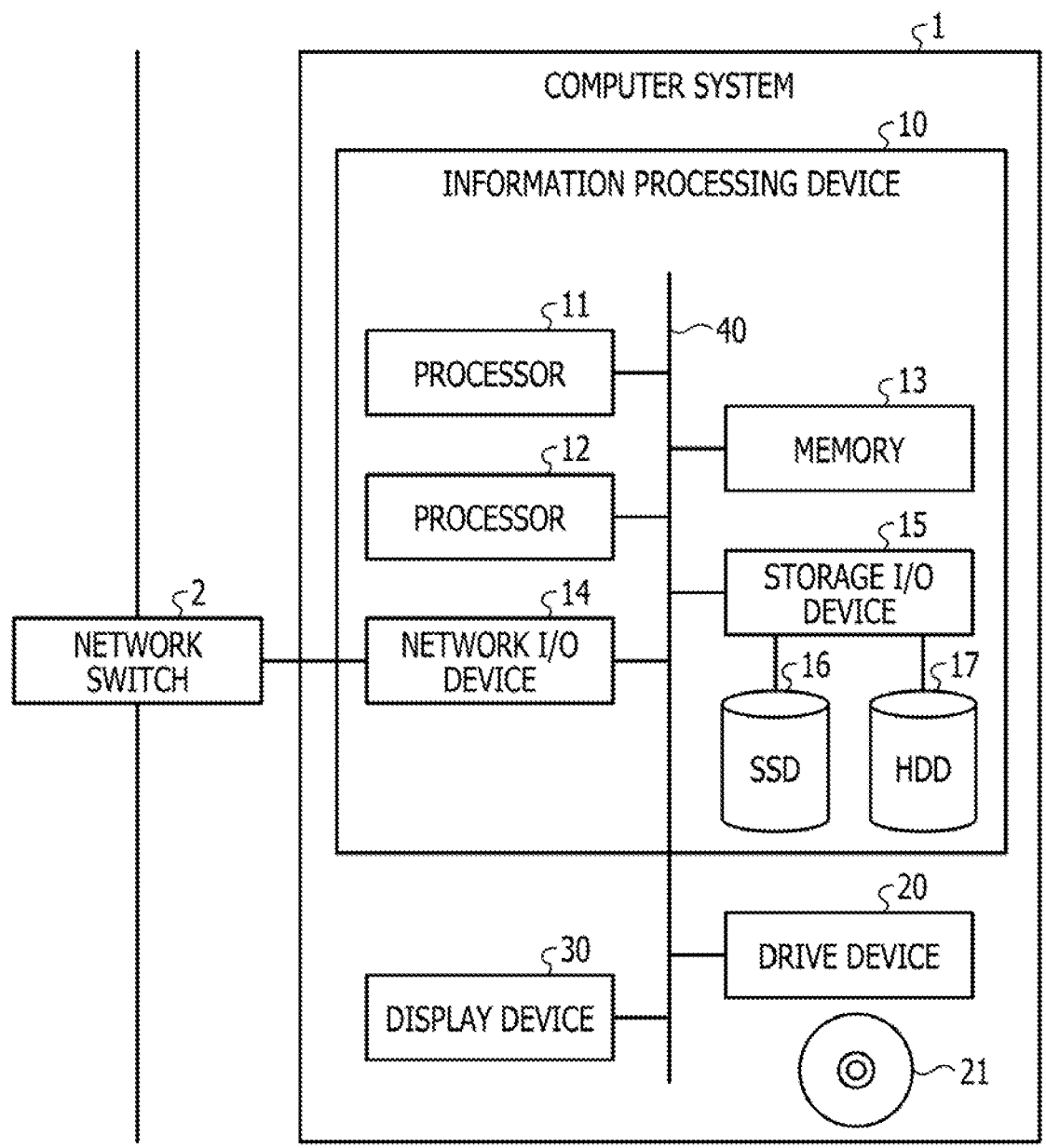
FIG. 1 is a hardware configuration diagram of a computer system.

FIG. 1 is a hardware configuration diagram of a computer system. A computer system 1 includes an information processing device 10, a drive device 20, and a display device 30.

The information processing device 10 includes processors 11 and 12, a memory 13, a network I/O device 14, a storage I/O device 15, a solid state drive (SSD), and a hard disk drive (HDD). The processors 11 and 12, the memory 13, the network I/O device 14, the storage I/O device 15, the drive device 20, and the display device 30 are connected to each other by a bus 40.

Furthermore, each of the processors 11 and 12 has a plurality of cores. The processors 11 and 12 load a program into a memory 13, and execute it. At the time of executing a program, each core of the processors 11 and 12 executes a thread included in the program.

The processors 11 and 12 execute the program to run an application. Then, the processors 11 and 12 cause the network I/O device 14 to communicate with the outside via the network switch 2 by running the application. Furthermore, the processors 11 and 12 read and write data to an SSD 16 and an HDD 17 using the storage I/O device 15 by running the application. The I/O processing of data by the processors 11 and 12 using the network I/O device 14 or the storage I/O device 15 according to the present embodiment will be described in detail later. Here, while the processors 11 and 12 are illustrated in FIG. 1, the number of the processors is not particularly limited.

The network I/O device 14 is a high-speed I/O device such as InfiniBand. The network I/O device 14 is connected to a network switch 2. The network I/O device 14 receives an instruction from the processors 11 or 12, and transmits/receives data to/from an external device via the network switch 2.

The SSD 16 and the HDD 17 are large-capacity auxiliary storage devices. The SSD 16 and the HDD 17 store various programs and data.

The storage I/O device 15 is a high-speed I/O device such as NVMe. The storage I/O device 15 is connected to the SSD 16 and the HDD 17. The storage I/O device 15 receives an instruction from the processor 11 or 12, and read and write data to the SSD 16 and the HDD 17.

A removable portable storage medium 21, such as a magnetic disk or an optical disk, is inserted into the drive device 20, for example, and data is written to or read from the inserted portable storage medium 21.

The display device 30 displays images transmitted from the processors 11 and 12. A user may receive information by checking the display device 30.

Figure 2:
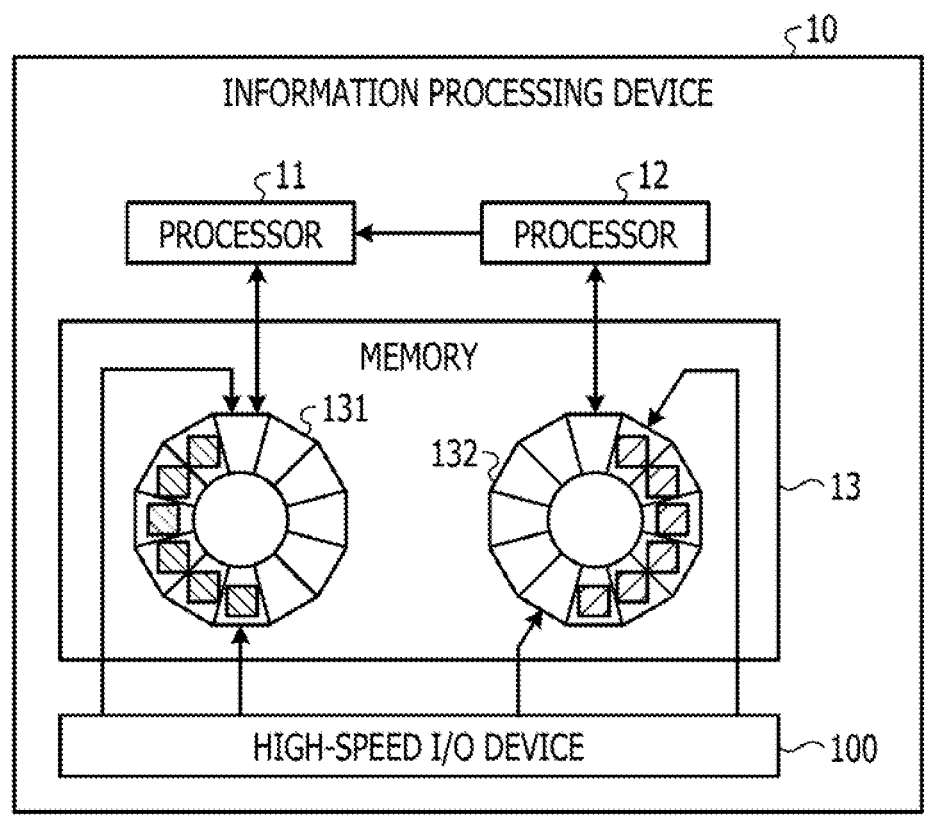
FIG. 2 is a diagram for explaining I/O processing using a request between a processor and a high-speed I/O device.

FIG. 2 is a diagram for explaining I/O processing using a request between a processor and a high-speed I/O device. Next, an outline of the I/O processing by the processors 11 and 12 will be described with reference to FIG. 2. Here, descriptions will be given with the network I/O device 14 and the storage I/O device 15 collectively referred to as a high-speed I/O device 100. Furthermore, the processor 11 runs the application to operate an I/O waiting thread that issues an I/O request. Furthermore, the processor 12 operates a notification completion thread that determines whether or not the I/O processing by the high-speed I/O device is complete. Furthermore, a request queue 131 and a response queue 132 are arranged in the memory 13.

The I/O waiting thread executed by the processor 11 generates a request for instructing execution of the I/O processing in a case of causing the high-speed I/O device 100 to perform the I/O processing. Next, the I/O waiting thread executed by the processor 11 writes the request requesting the I/O processing to the request queue 131. Thereafter, the I/O waiting thread executed by the processor 11 waits until a response to the issued request is returned. Then, when a response is detected by the notification completion thread executed by the processor 12, the I/O waiting thread executed by the processor 11 resumes the processing execution.

The high-speed I/O device 100 reads the request stored in the request queue 131. Then, the high-speed I/O device 100 performs the I/O processing instructed by the request. Thereafter, the high-speed I/O device 100 stores the response storing the result of the executed I/O processing in the response queue 132.

The I/O completion notification thread executed by the processor 11 polls the response queue 132, and monitors the storage of the response. The I/O completion notification thread obtains the response stored in the response queue 132 by the high-speed I/O device 100, and confirms completion of the I/O processing. Then, the I/O completion notification thread executed by the processor 12 resumes the I/O waiting thread.

Figure 3:
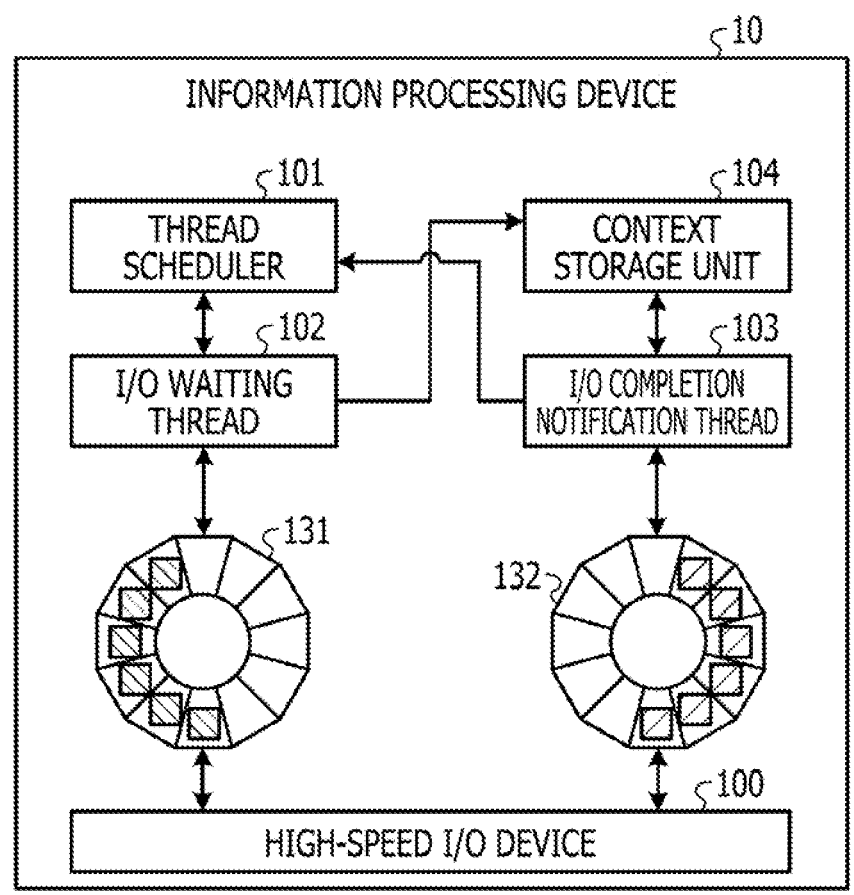
FIG. 3 is a block diagram related to execution of the I/O processing.

Next, operations of the I/O waiting thread 102 and the I/O completion notification thread 103 according to the present embodiment during the I/O processing will be described in detail with reference to FIG. 3. FIG. 3 is a block diagram related to execution of the I/O processing. Hereinafter, operation when the I/O processing is executed in the information processing device 10 will be described. The I/O waiting thread 102 corresponds to an example of a "first processing unit" and a "first thread", and the I/O completion notification thread 103 corresponds to an example of a "second processing unit" and a "second thread".

The information processing device 10 has a thread scheduler 101 to be implemented by the processors 11 and 12, the I/O waiting thread 102, and the I/O completion notification thread 103. Furthermore, the information processing device 10 has a context storage unit 104, the request queue 131, and the response queue 132 in the memory 13.

The thread scheduler 101 manages a processing execution schedule of the I/O waiting thread 102 and the I/O completion notification thread 103. The thread scheduler 101 receives a request for switching from a thread such as the I/O waiting thread 102 and the I/O completion notification thread 103, and switches a thread that executes processing. The thread scheduler 101 is also operated by a thread. Hereinafter, a thread that operates the thread scheduler 101 will be referred to as a scheduler thread.

The thread scheduler 101 manages a waiting queue that stores information associated with the thread waiting to shift to the execution state. The thread scheduler 101 sequentially obtains the threads stored in the waiting queue, and transitions them to the state of processing execution to cause them to perform the processing. For example, in a case where the I/O waiting thread 102 that has issued a request for I/O processing and in a waiting state is stored in the waiting queue, the thread scheduler 101 obtains the I/O waiting thread 102 from the waiting queue when the turn comes. Then, the thread scheduler 101 sets the I/O waiting thread 102 to be a running thread, restores it to the processing execution state, and resumes the processing.

The I/O waiting thread 102 determines to cause the high-speed I/O device 100 to execute the I/O processing with respect to the processing of the running application. Then, the I/O waiting thread 102 obtains a request fd indicating that it is a thread waiting to execute the processing of the request.

Next, the I/O waiting thread 102 executes a thread switching function with a request writing function, thereby executing the following process. The I/O waiting thread 102 saves its own context in the area corresponding to an Fd number representing the request fd in the context storage unit 104. Furthermore, the I/O waiting thread 102 saves an Fd number dedicated to the scheduler thread of the thread scheduler 101 in its own stack. Next, the I/O waiting thread 102 writes the request to the request queue 131. Thereafter, the I/O waiting thread 102 requests the thread scheduler 101 to switch threads.

Here, the thread switching function with a request writing function is a function following the ABI convention, and is capable of retaining a Callee-saved register before and after reading the function. In addition, the thread switching function with a request writing function has the following parameters. The parameters include, for example, a name or memory address of the request queue 131 to be written to, a request including information associated with I/O commands, command parameters, and Fd numbers, and the like. In addition, the parameters include the Fd number assigned to the I/O waiting thread 102 that makes a request, the Fd number dedicated to the scheduler thread, and the like.

The I/O waiting thread 102 waits until a response to the request stored in the request queue 131 is returned. Thereafter, the I/O waiting thread 102 waits for the turn to be selected as a running thread to execute the process after the response is detected by the I/O completion notification thread 103 and the I/O processing completion notification is output. Then, the thread scheduler 101 switches threads, whereby the I/O waiting thread 102 returns to the state of executing the process. This state from storing the request in the request queue 131 to returning to the state of executing the process corresponds to an example of a "state of waiting for completion of I/O processing". Thereafter, the I/O waiting thread 102 releases the request fd for waiting for the request, and resumes and continues the execution of the application processing.

As described above, in the information processing device 10 according to the present embodiment, the I/O waiting thread 102 executes processing in the order of saving the context, writing the request to the request queue 131, and switching the thread at the time of request issuance. As a result, at the time of writing the request to the request queue 131, the context of the I/O waiting thread 102 is reliably saved, whereby it becomes possible to avoid an abnormality occurrence due to synchronization passing and to reliably restore the I/O waiting thread 102 to the state of processing execution.

Furthermore, the I/O waiting thread 102 according to the present embodiment uses a function following the ABI convention as a thread switching function with a request writing function. With this function used, in a case where an Fd number dedicated to the scheduler thread has been obtained as an argument for thread switching, the I/O waiting thread 102 saves the Fd number dedicated to the scheduler thread in the stack of the I/O waiting thread 102. As a result, the I/O waiting thread 102 prevents corruption of the Fd number dedicated to the scheduler thread due to reading of a request writing function. Then, after the writing of the request is executed, the I/O waiting thread 102 is enabled to restore the Fd number dedicated to the scheduler thread from the stack to reliably perform thread switching.

Furthermore, the I/O waiting thread 102 according to the present embodiment uses one thread switching function with a request writing function that sequentially performs three processes of context saving, request writing to the request queue 131, and a thread switching request. This ensures that the order of the three processes is followed. However, the I/O waiting thread 102 may use different functions for execution of the respective processes, or may use a function that combines two processes, as long as the order of the three processes is ensured.

Returning to FIG. 3, the description will be continued. The I/O completion notification thread 103 polls the response queue 132. Then, the I/O completion notification thread 103 obtains the request stored in the response queue 132, and confirms the I/O completion. Next, the I/O completion notification thread 103 identifies the request fd from the obtained response. Next, the I/O completion notification thread 103 obtains the context of the I/O waiting thread 102 using the identified request fd. Thereafter, the I/O completion notification thread 103 requests the thread scheduler 101 to insert the I/O waiting thread 102 into the waiting queue.

Figure 4:
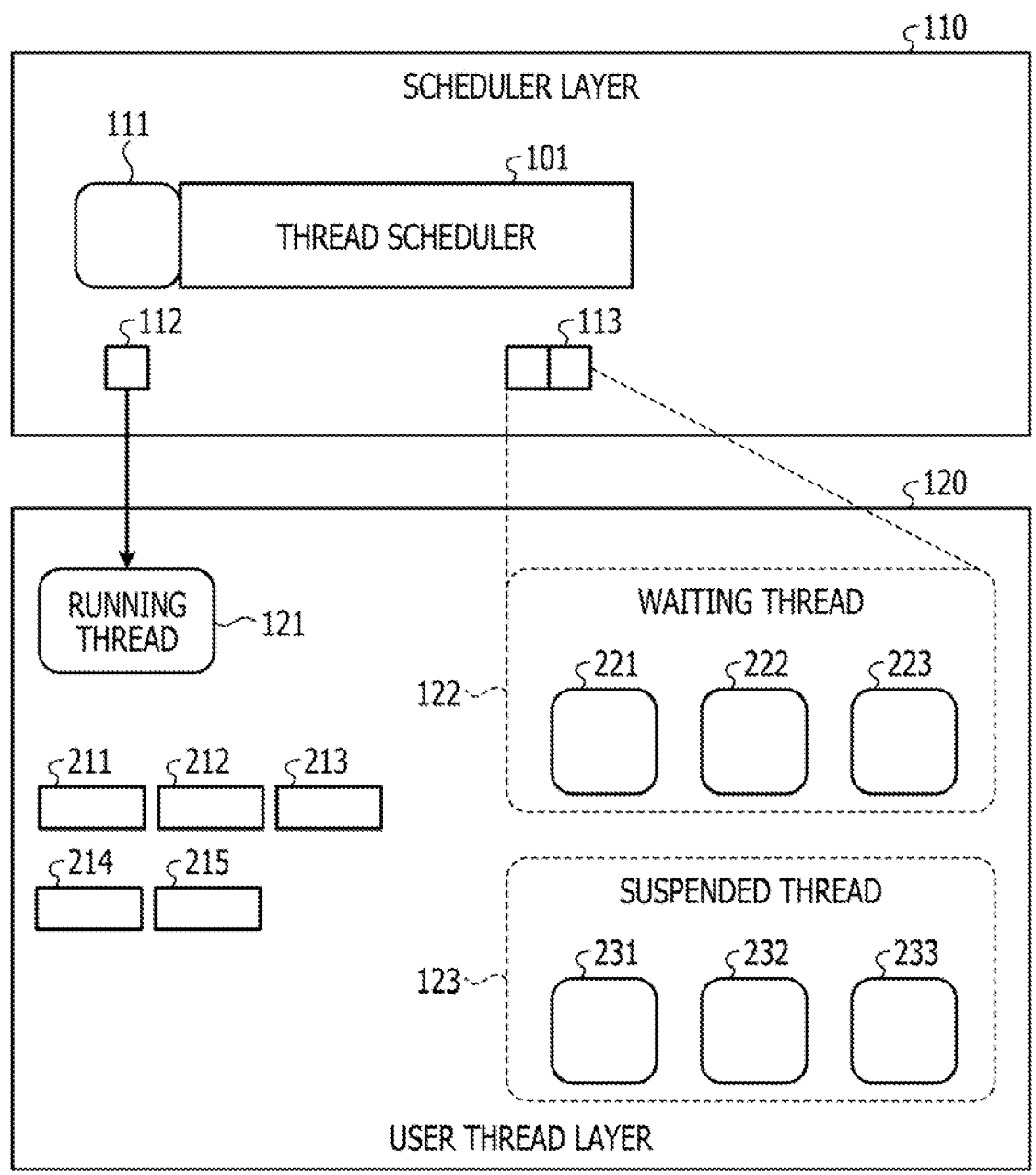
FIG. 4 is a diagram for explaining details of processing of each thread associated with request issuance.

FIG. 4 is a diagram for explaining details of processing of each thread associated with request issuance. Next, a state transition at the time of request writing by the I/O waiting thread 102 according to the present embodiment will be described in more detail using FIG. 4.

FIG. 4 illustrates a state in which the processors 11 and 12 loads a program in the memory 13 and executes an application. In the memory 13, a scheduler layer 110 that manages the schedule of thread processing execution and a user thread layer 120 that operates each thread in the application are loaded.

In the scheduler layer 110, the thread scheduler 101 operates by the scheduler thread 111. Furthermore, in the scheduler layer 110, there is running thread information 112, which is a pointer indicating the running thread 121 that executes the processing at that time. Moreover, in the scheduler layer 110, there is a waiting queue 113 that indicates a waiting thread 122, which is a thread that waits in an executable state.

In the user thread layer 120, the running thread 121, which is a thread executing processing, operates. Furthermore, in the user thread layer 120, there is the waiting thread 122, which is a thread that waits in an executable state. FIG. 4 illustrates a case where threads 221 to 223 exist as the waiting threads 122. Furthermore, in the user thread layer 120, there is a suspended thread 123, which is a thread that waits for a transition to an executable state such as waiting for completion of the I/O processing that has made the request. FIG. 4 illustrates a case where threads 231 to 233 exist as the suspended threads 123. Moreover, in the user thread layer 120, there are stacks 211 to 215 assigned to the respective threads. For example, the stack 211 is assigned to the running thread 121. Furthermore, the stack 212 is assigned to the thread 221, and the stack 213 is assigned to the thread 222. Furthermore, the stack 214 is assigned to the scheduler thread 111. Furthermore, the stack 215 is assigned to the thread 231. While FIG. 4 illustrates the stacks 211 to 215 with the allocations above, stacks are assigned to other threads in a similar manner.

Here, a data structure will be described. Threads are identified using a thread identifier (ID), which is an identifier assigned to each thread. In addition, it is possible to search for a thread structure for the thread using the thread ID. A thread structure includes state information indicating a state of a thread, a CPU number indicating the processor 11 or 12 executing the thread, and a context structure. The context structure includes a stack, an instruction counter, a stack pointer, and a Callee-saved register, which is a subset of general-purpose registers defined as ABIs for each OS. For example, the thread structure corresponds to the context storage unit 104 in FIG. 3. Furthermore, request waiting is distinguished by the request fd. With the request fd used, it becomes possible to search for the request waiting structure for the request. The request waiting structure contains tid, which is a value of the thread ID.

A case where the running thread 121 is the I/O waiting thread 102 and the high-speed I/O device 100 is requested for I/O processing will be described. The I/O waiting thread 102, which is the running thread 121, obtains the request fd waiting for the request. Then, the I/O waiting thread 102 stores the CPU number for executing itself as a CPU number in the thread structure indicated by tid. Next, the I/O waiting thread 102 stores its own context in the context structure included in the thread structure indicated by tid. Then, the running I/O waiting thread 102 whose thread ID is tid executes the I/O processing request. Next, the I/O waiting thread 102 changes the state of the thread in such a manner that the state of the thread registered in the thread structure indicated by tid is changed to suspend. Next, the I/O waiting thread 102 sets information associated with the context structure included in the thread structure indicated by tid while setting information associated with the context structure of the thread structure used by the scheduler thread 111 in the context, and resumes the thread scheduler 101. As a result, the I/O waiting thread 102, which has been the running thread 121, transitions to the suspended thread 123.

The I/O completion notification thread 103 reads the I/O response by polling, and obtains the response from the response queue 132. Next, the I/O completion notification thread 103 reads the request fd included in the response data. Then, the I/O completion notification thread 103 searches for and identifies the request waiting structure using the obtained request fd. Next, the I/O completion notification thread 103 obtains tid, which is a value of the thread ID, from the identified request waiting structure. Next, the I/O completion notification thread 103 identifies the thread structure indicated by the obtained tid. Next, the I/O completion notification thread 103 obtains the CPU number from the identified thread structure. Next, the I/O completion notification thread 103 changes the state of the thread registered in the thread structure indicated by tid to waiting. Then, the I/O completion notification thread 103 obtains the CPU number stored in the thread structure indicated by tid, and registers the thread ID indicated by tid in the waiting queue 113 managed by the processor 11 or 12 having the CPU number. As a result, in a case where, for example, the thread corresponding to the thread structure indicated by tid is the I/O waiting thread 102, the I/O waiting thread 102 that has been the suspended thread 123 transitions to the waiting thread 122. The I/O completion notification thread 103 repeats the process above.

The thread scheduler 101 monitors the waiting queue 113. In a case where the waiting queue 113 is empty, the thread scheduler 101 waits until the thread ID of the waiting thread 122 is registered in the waiting queue 113. In a case where the thread ID is registered in the waiting queue 113, the thread scheduler 101 obtains the thread ID from the waiting queue 113. Then, the thread scheduler 101 sets the obtained thread ID as tid. Next, the thread scheduler 101 identifies the thread structure indicated by tid. Next, the thread scheduler 101 changes the state of the thread registered in the thread structure indicated by tid to running. Next, the thread scheduler 101 obtains the CPU number of the processor 11 or 12 that executes itself. Then, the thread scheduler 101 saves its own context in the context structure of the thread structure assigned to the thread scheduler 101 executed by the processor of the obtained CPU number. Thereafter, the thread scheduler 101 sets the information associated with the context structure included in the thread structure indicated by tid in the context, and restores the I/O waiting thread 102 to the processing execution state. As a result, the I/O waiting thread 102, which has been the waiting thread 122, transitions to the running thread 121. It can be said that the I/O waiting thread 102 resumes operation using the context when the I/O completion notification thread 103 outputs notification of completion of the I/O processing.

Figure 5:
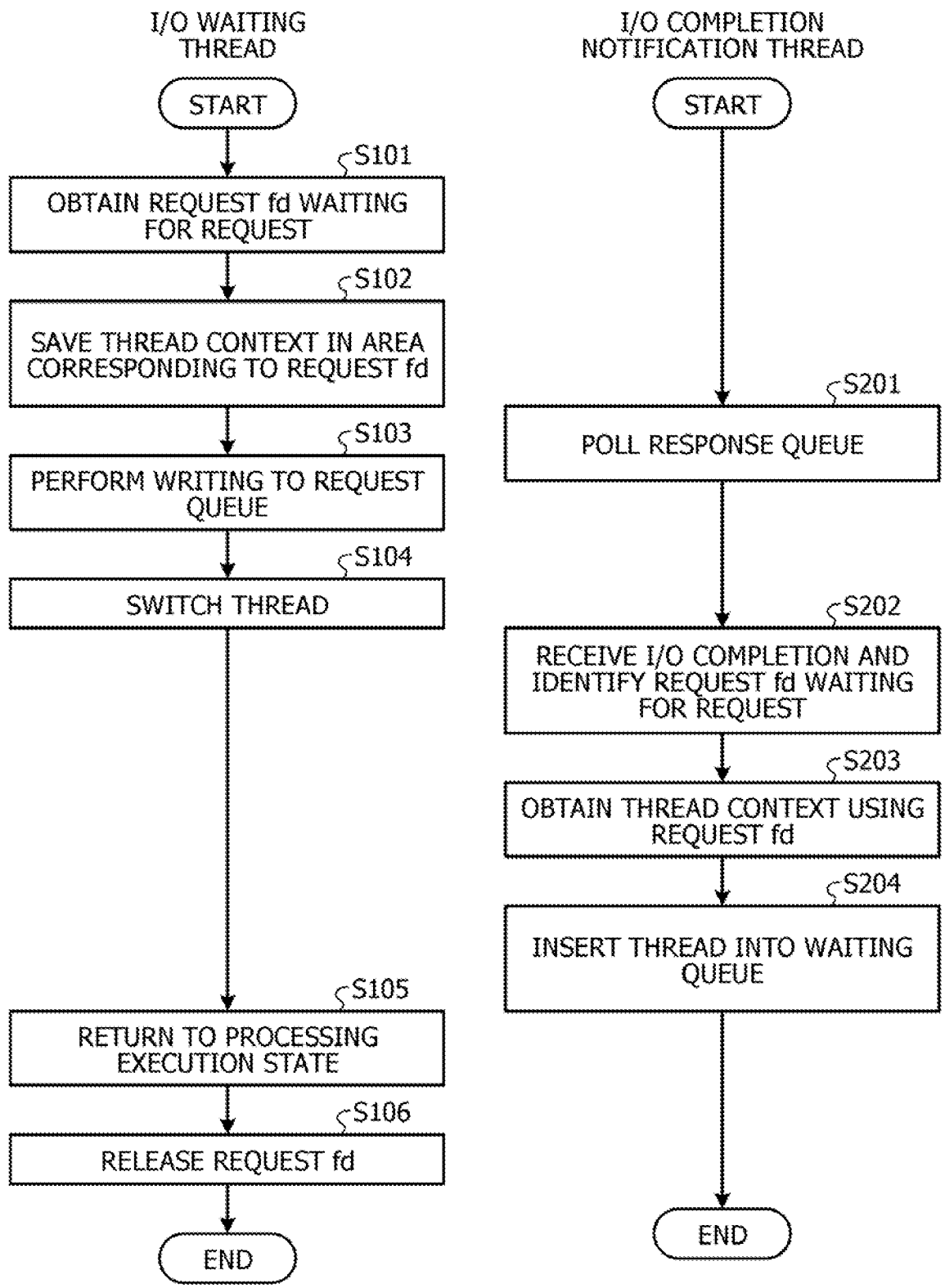
FIG. 5 is a flowchart of I/O processing by an information processing device according to a first embodiment.

Next, a flow of the I/O processing by the information processing device 10 according to the present embodiment will be described with reference to FIG. 5. FIG. 5 is a flowchart of the I/O processing by the information processing device according to the first embodiment.

The I/O waiting thread 102 obtains the request fd waiting for a request (step S101).

Next, the I/O waiting thread 102 saves its own context in the area of the context storage unit 104 corresponding to the obtained request fd (step S102).

Next, the I/O waiting thread 102 writes the request to the request queue 131 (step S103).

Next, the I/O waiting thread 102 switches the running thread 121 to the scheduler thread 111 (step S104).

The I/O completion notification thread 103 regularly polls the response queue 132 (step S201).

Then, the I/O completion notification thread 103 receives I/O completion by obtaining a response from the response queue 132, and identifies the request fd waiting for the request (step S202).

Next, the I/O completion notification thread 103 obtains the context of the I/O waiting thread 102 using the obtained request fd (step S203).

Next, the I/O completion notification thread 103 inserts the I/O waiting thread 102 into the waiting queue 113 using the obtained context (step S204).

The I/O waiting thread 102 is obtained by the thread scheduler 101 from the waiting queue 113, and transitions to the running thread 121, thereby returning to the state of processing execution (step S105).

Thereafter, the I/O waiting thread 102 releases the request fd (step S106).

As described above, in the information processing device according to the present embodiment, the I/O waiting thread executes processing in the order of saving the context, writing the request to the request queue, and switching the thread at the time of request issuance. As a result, at the time of writing the request to the request queue, the context of the I/O waiting thread is reliably saved, whereby it becomes possible to avoid an abnormality occurrence due to synchronization passing. For example, it becomes possible to reliably restore the I/O waiting thread to the state of processing execution. Therefore, it becomes possible to perform I/O control without a system call using the kernel bypass technology while suppressing the abnormality occurrence such as deadlock and ensuring reliability, and to improve the performance of the I/O processing.

Second Embodiment

Next, a second embodiment will be described. An information processing device according to the present embodiment is also illustrated in FIGS. 1 to 3. An information processing device 10 according to the present embodiment is different from that of the first embodiment in that an I/O waiting thread 102 performs processing in the order of context saving, thread switching, and writing of a request to a request queue 131. In the following description, descriptions of operations of respective units similar to those of the first embodiment are omitted.

Operations of an I/O waiting thread and an I/O completion notification thread according to the present embodiment during the I/O processing will be described in detail with reference to FIG. 3.

The I/O waiting thread 102 determines to cause a high-speed I/O device 100 to execute the I/O processing during execution of application processing. Then, the I/O waiting thread 102 obtains a request fd indicating that it is a thread waiting to execute the processing of the request.

Next, the I/O waiting thread 102 according to the present embodiment executes a thread switching function with a request writing function, thereby executing the following process. The I/O waiting thread 102 saves its own context in the area corresponding to an Fd number representing the request fd in the context storage unit 104. Furthermore, the I/O waiting thread 102 saves an Fd number dedicated to a scheduler thread 111, which is a thread of a thread scheduler 101, in its own stack. Next, the I/O waiting thread 102 requests the thread scheduler 101 to switch threads. Thereafter, the I/O waiting thread 102 writes the request to the request queue 131.

The thread switching function with a request writing function according to the present embodiment is also a function following the ABI convention. With this function used, the I/O waiting thread 102 saves information used for writing of the request queue 131 in a stack 214 of a scheduler thread 111 in such a manner that it becomes accessible after switching to a scheduler thread 111. Examples of the information used for writing of the request queue 131 include a function address and a parameter list. As a result, the I/O waiting thread 102 is enabled to prevent corruption of the information used for writing of the request queue 131 due to thread switching. In addition, after the thread switching is complete, the I/O waiting thread 102 restores the information used for writing of the request queue 131 from the stack 214, thereby being enabled to reliably write the request to the request queue 131.

Here, the prevention of the corruption of the information used for writing of the request queue 131 due to thread switching will be described in more detail. First, a case of performing the processing in the order of writing of a request to the request queue 131, context saving, and thread switching in a conventional manner will be described. In this procedure, the writing of the request to the request queue 131 is performed by the I/O waiting thread 102, and is before the context saving. Therefore, in the writing of the request to the request queue 131, the I/O waiting thread 102 makes a normal function call. The context may not be taken into consideration in a normal function. Meanwhile, the following may be considered in the case of the procedure according to the present embodiment.

A thread is a logical or virtual processor, and each thread as a register set called context, such as a program counter and a general-purpose register originally included in a physical processor 11 and the like.

In the thread switching, a running thread 121 is switched from the I/O waiting thread 102 running at that time to the scheduler thread 111. At a time point when the thread switching is complete, in the physical processor 11, replacement with the context, that is, for example, the register set, previously saved by the thread scheduler 101 in the processor 11 is carried out, and the thread scheduler 101 grasps that the execution resumes immediately after the saving of the context.

While the thread scheduler 101 executes the writing of the request to the request queue 131, this is processing inserted from the I/O waiting thread 102, and is not the original processing to be executed by the thread scheduler 101 immediately after the restart. Therefore, it is preferable that the I/O waiting thread 102 writes the request to the request queue 131 not to interfere with the processing to be executed by the thread scheduler 101 immediately after the restart. In other words, for example, it is preferable that the I/O waiting thread 102 writes the request to the request queue 131 in such a manner that the register set after execution of the thread switching and the register set after execution of the request writing to the request queue 131 do not change.

Here, with the thread switching function with a request writing function used in the present embodiment, the I/O waiting thread 102 saves information used for writing of the request queue 131 in the stack 214 of the scheduler thread 111. As a result, the I/O waiting thread 102 is allowed to access the information used for writing of the request queue 131 after the switching to the scheduler thread 111. While the information used for writing of the request queue 131 is information naturally grasped by the I/O waiting thread 102, it is information not known by the thread scheduler 101. Therefore, the information is lost after the thread switching if the information used for writing of the request queue 131 is not passed, whereby it becomes difficult for the thread scheduler 101 to obtain the information used for writing of the request queue 131.

Note that the context of the thread scheduler 101 is accessible from the I/O waiting thread 102. This access includes access to the stack 214 assigned to the thread scheduler 101, whereby the I/O waiting thread 102 is enabled to save the information used for writing of the request queue 131 in the stack 214 of the scheduler thread 111.

Figure 6:
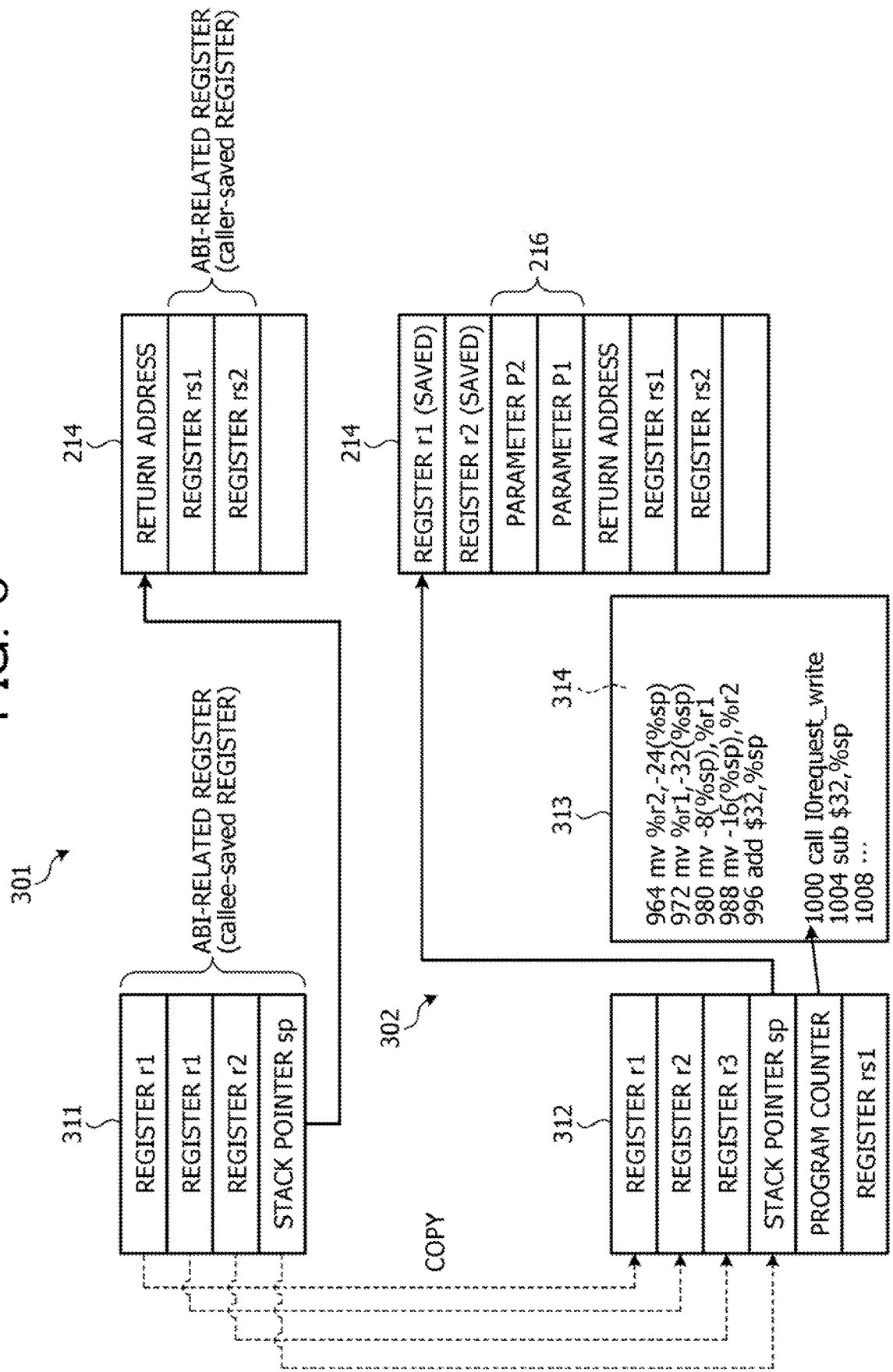
FIG. 6 is a first diagram for explaining a thread switching function and a request writing function.
Figure 7:
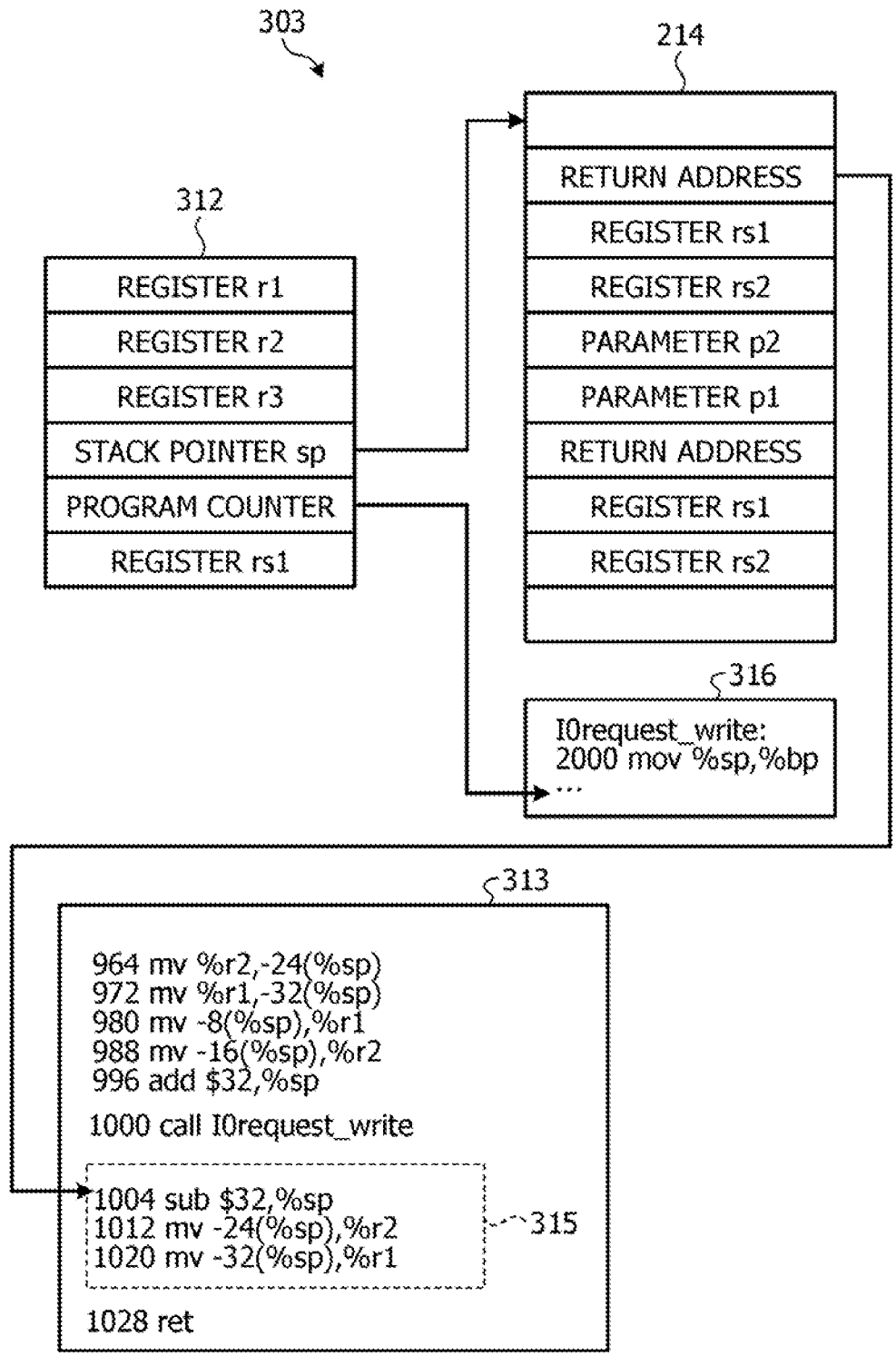
FIG. 7 is a second diagram for explaining the thread switching function and the request writing function.
Figure 8:
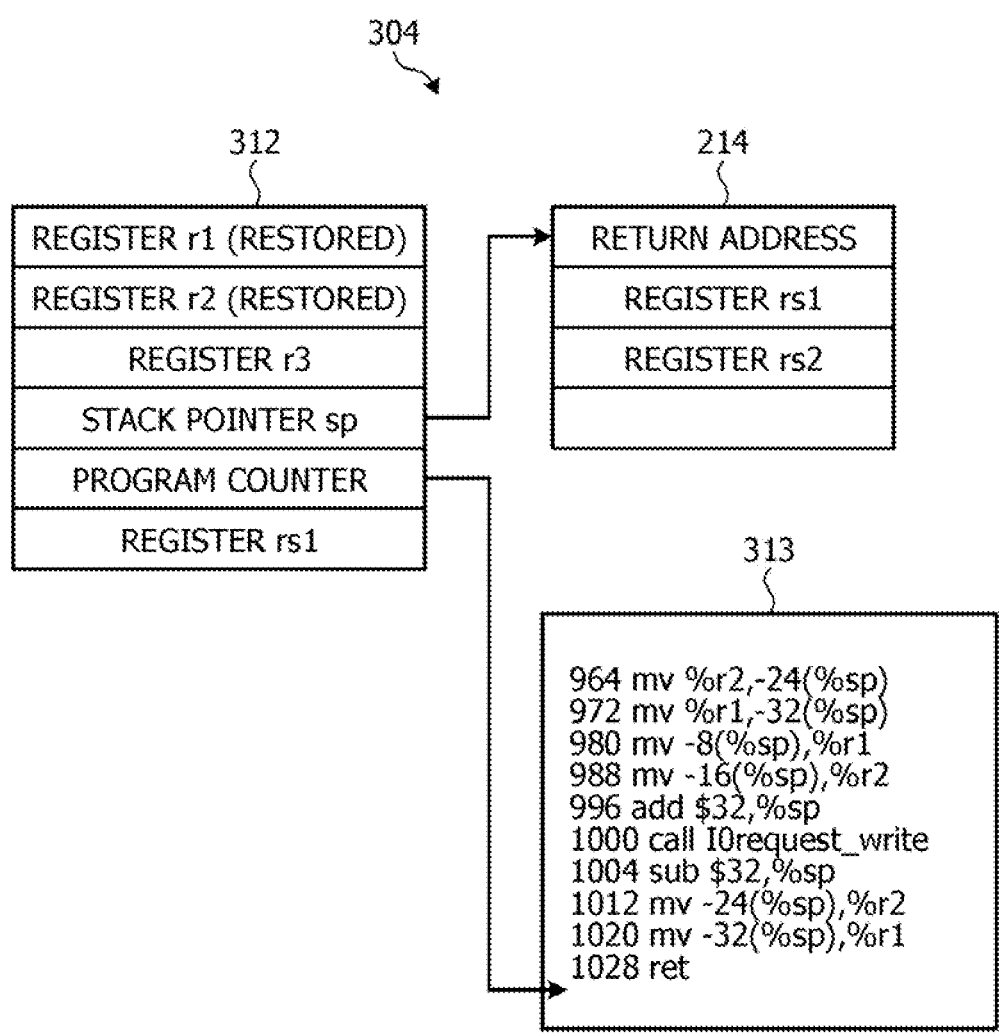
FIG. 8 is a third diagram for explaining the thread switching function and the request writing function.
Figure 9:
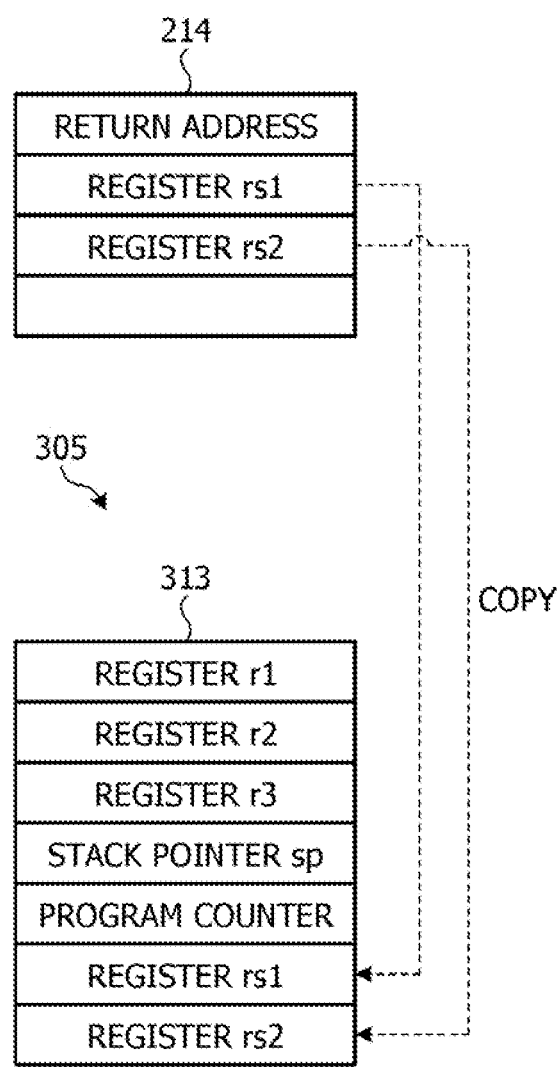
FIG. 9 is a fourth diagram for explaining the thread switching function and the request writing function.

FIG. 6 is a first diagram for explaining a thread switching function and a request writing function. FIG. 7 is a second diagram for explaining the thread switching function and the request writing function. FIG. 8 is a third diagram for explaining the thread switching function and the request writing function. FIG. 9 is a fourth diagram for explaining the thread switching function and the request writing function. Next, the thread switching function and the I/O request writing function will be further described with reference to FIGS. 6 to 9.

Here, an assembler code will be used for explanation. The thread switching function is written in assembler, and calls the I/O request writing function inside thereof. An assembler code 313 in FIG. 6 is a part of the thread switching function as an example. The assembler code 313 corresponds to a part that calls ret, which is a return instruction, after calling the request writing function in the thread switching function. The I/O waiting thread 102 executes the assembler code 313 in a similar manner to normal function execution.

Furthermore, a case where the request writing function has two parameters will be described here. However, the parameter of the request writing function may be zero or more. In a case where the parameter is zero, the number of registers used at the time of passing the parameter is zero, and saving and restoration of the register may not be considered. It is sufficient if the request writing function follows the ABI, and it is assumed to be written in the C language here.

A state 301 in FIG. 6 represents the state before the thread switching. Furthermore, a state 302 represents the state immediately before the thread switching is performed.

Before the thread switching, a context structure 311 of the scheduler thread 111 retains information illustrated in the state 301 in the ABI-related register. Then, a stack pointer sp retained by the context structure 311 is registered as a return address in the stack 214 of the scheduler thread 111. This return address is information indicating the restart position of the scheduler thread 111. Furthermore, the stack 214 has the ABI-related register.

Then, the I/O waiting thread 102 executes the thread switching function immediately before the thread switching. Syntax 314 in the assembler code 313 represents processing of setting a call parameter of the request writing function in the register and processing of saving the register executed in the processing in advance. As a result, as illustrated in the state 302, the information of the context structure 311 of the scheduler thread 111 is copied to the register set 312 of the processor 11. The stack pointer sp copied to the register set 312 specifies the stack 214 of the scheduler thread 111. Then, the information registered in the context structure 311 of the scheduler thread 111 is saved in the stack 214. Moreover, the stack 214 stores parameters p1 and p2, which are parameters for the I/O request function. Then, the program counter in the register set 312 points to the line of the request writing function call in the assembler code 313.

Next, a state 303 in FIG. 7 represents a state during the thread switching. The I/O waiting thread 102 executes the request writing function. The stack pointer sp of the register set 312 of the processor 11 specifies the stack 214 of the scheduler thread 111. Moreover, the program counter of the register set 312 indicates an assembler code 316 of the request function. The return address of the stack 214 indicates the beginning of syntax 315 in the assembler code 313. The syntax 315 represents processing of restoring the changed register.

A state 304 in FIG. 8 represents a state before the I/O waiting thread 102 receives a return instruction during the thread switching. The stack pointer sp of the register set 312 of the processor 11 specifies the stack 214 of the scheduler thread 111. Furthermore, the program counter of the register set 312 points to the ret line, which is the return instruction.

A state 305 in FIG, 9 represents a state after the thread switching is complete and the I/O waiting thread 102 returns to the processing execution state. At this time, the information stored in the stack 214 of the scheduler thread 111 is copied to the register set 312 of the processor 11. The program counter of the register set 312 in this case indicates the restart position of the scheduler thread 111.

Figure 10:
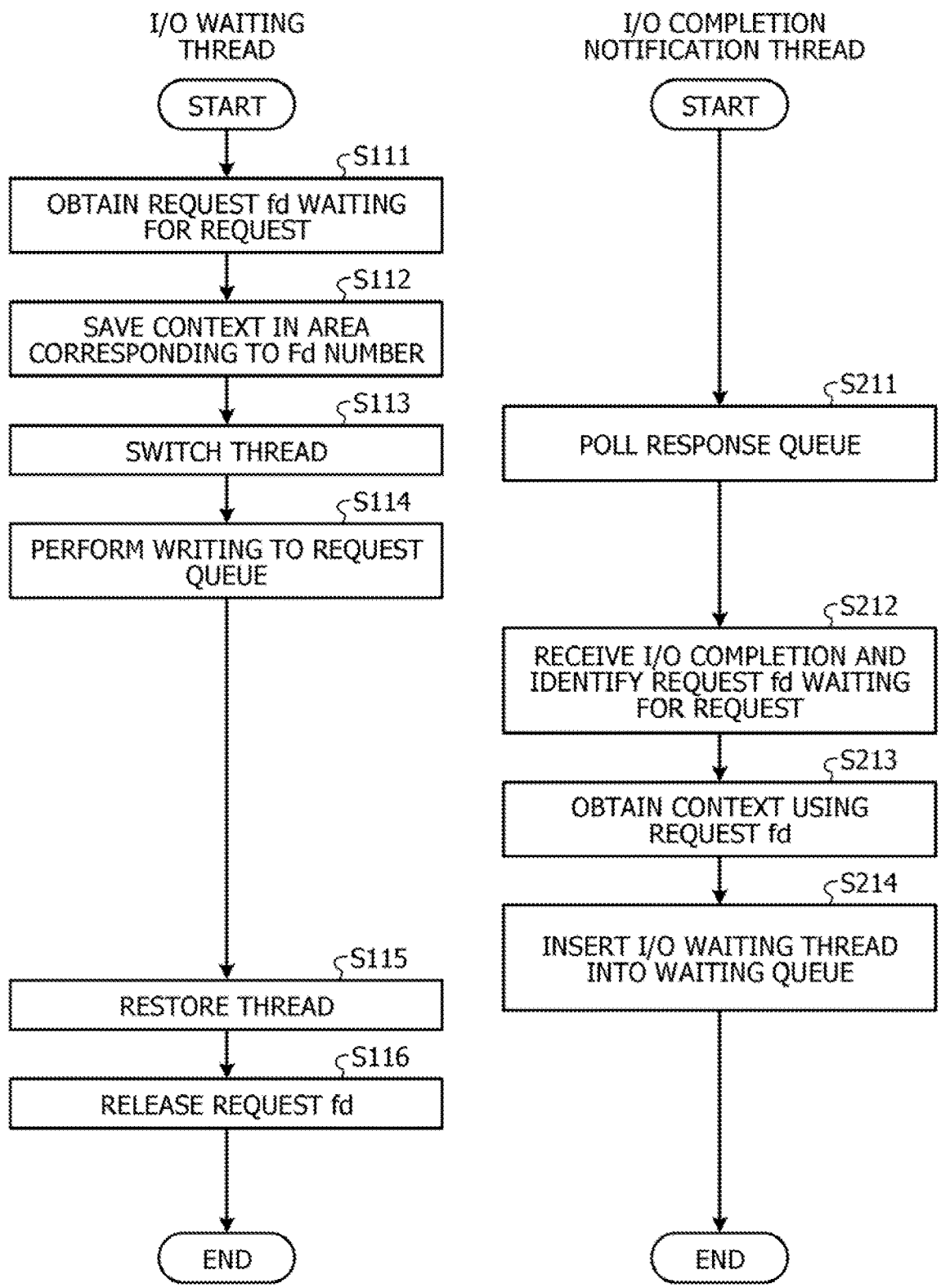
FIG. 10 is a flowchart of I/O processing by an information processing device according to a second embodiment.

Next, a flow of the I/O processing by the information processing device 10 according to the present embodiment will be described with reference to FIG. 10. FIG. 10 is a flowchart of the I/O processing by the information processing device according to the second embodiment.

The I/O waiting thread 102 obtains the request fd waiting for a request (step S111).

Next, the I/O waiting thread 102 saves its own context in the area of the context storage unit 104 corresponding to the obtained request fd (step S112).

Next, the I/O waiting thread 102 switches the running thread 121 to the scheduler thread 111 (step S113).

Next, the I/O waiting thread 102 writes the request to the request queue 131 (step S114).

An I/O completion notification thread 103 regularly polls a response queue 132 (step S211).

Then, the I/O completion notification thread 103 receives I/O completion by obtaining a response from the response queue 132, and identifies the request fd waiting for the request (step S212).

Next, the I/O completion notification thread 103 obtains the context of the I/O waiting thread 102 using the obtained request fd (step S213).

Next, the I/O completion notification thread 103 inserts the I/O waiting thread 102 into the waiting queue 113 using the obtained context (step S214).

The I/O waiting thread 102 is obtained by the thread scheduler 101 from the waiting queue 113, and transitions to the running thread 121, thereby returning to the state of processing execution (step S115).

Thereafter, the I/O waiting thread 102 releases the request fd (step S116).

As described above, in the information processing device according to the present embodiment, the I/O waiting thread executes processing in the order of saving the context, switching the thread, and writing the request to the request queue 131 at the time of request issuance. Even in the case of performing the processing in this order, at the time of writing the request to the request queue, the context of the I/O waiting thread is reliably saved, whereby it becomes possible to avoid an abnormality occurrence due to synchronization passing. For example, it becomes possible to reliably restore the I/O waiting thread to the state of processing execution. Therefore, it becomes possible to improve the performance of the I/O processing using the kernel bypass technology while suppressing the abnormality occurrence such as deadlock and ensuring reliability.

Third Embodiment

Next, a third embodiment will be described. An information processing device according to the present embodiment is also illustrated in FIGS. 1 to 3. An information processing device 10 according to the present embodiment is different from that of the first embodiment in that I/O request writing processing is generalized and is made replaceable. In the following description, descriptions of operations of respective units similar to those of the first embodiment are omitted.

An I/O waiting thread 102 according to the present embodiment has a thread switching function with an indirect function calling function that executes processing of saving its own context in the area indicated by an Fd number, processing of calling an indirect function, and processing of thread switching in that order.

The I/O waiting thread 102 determines to cause a high-speed I/O device 100 to execute the I/O processing during execution of application processing. Then, the I/O waiting thread 102 obtains a request fd indicating that it is a thread waiting to execute the processing of the request.

Next, the I/O waiting thread 102 according to the present embodiment secures an area for a function object, and sets a request writing function, identification information such as a name and memory address of a request queue 131, an I/O command, and an I/O parameter in the function object. With the indirect function executed using this information, the request is inserted into the request queue 131.

Next, the I/O waiting thread 102 executes the thread switching function with an indirect function calling function, thereby executing the following process. The I/O waiting thread 102 saves its own context in the area corresponding to an Fd number representing the request fd in the context storage unit 104. Furthermore, the I/O waiting thread 102 saves an Fd number dedicated to the scheduler thread of the thread scheduler 101 in its own stack. Next, the I/O waiting thread 102 calls the indirect function to the thread scheduler 101, and executes the indirect function using the function object, thereby writing the request to the request queue 131. Thereafter, the I/O waiting thread 102 requests the thread scheduler 101 to switch threads.

Figure 11:
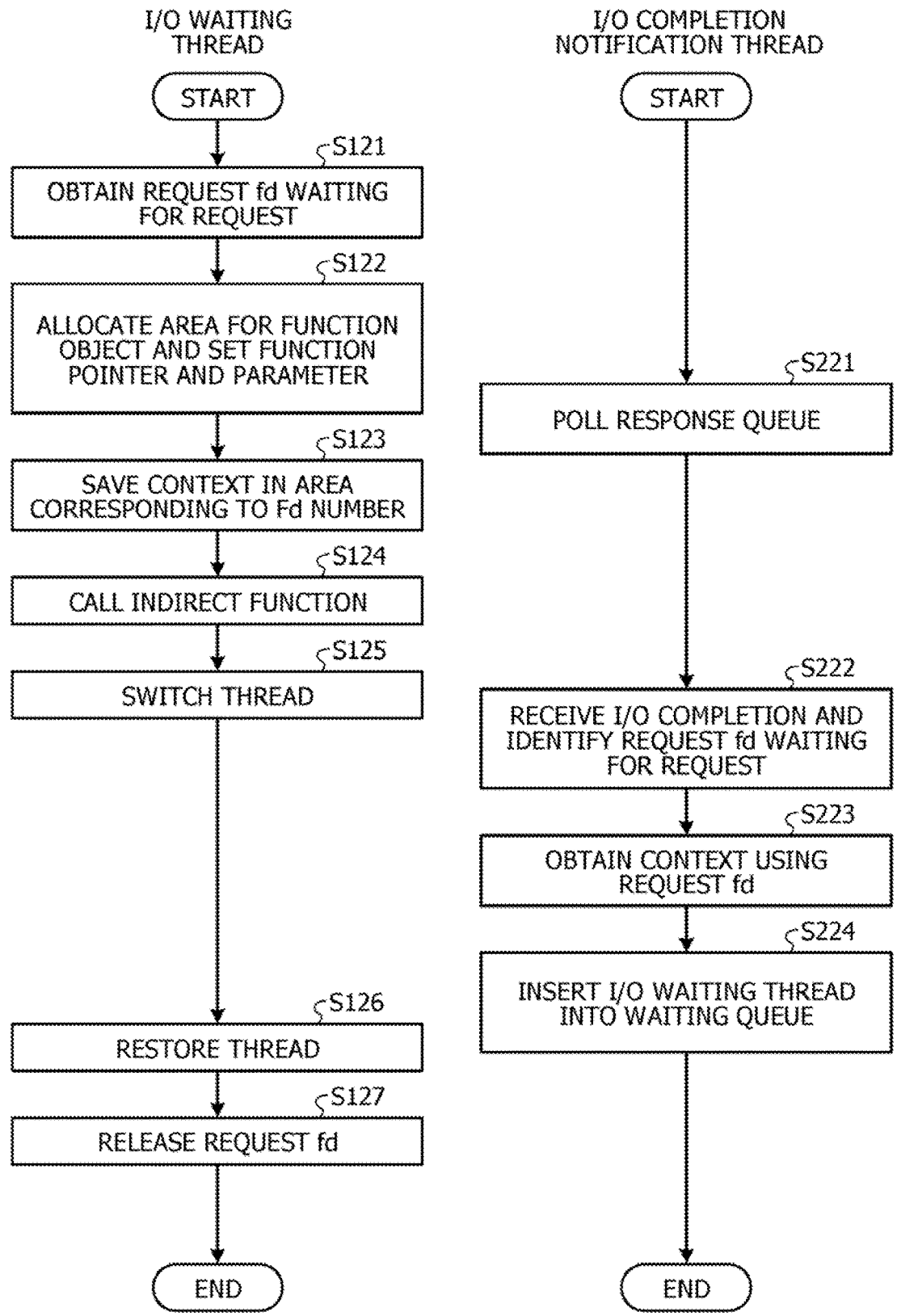
FIG. 11 is a flowchart of I/O processing by an information processing device according to a third embodiment.

Next, a flow of the I/O processing by the information processing device 10 according to the present embodiment will be described with reference to FIG. 11. FIG. 11 is a flowchart of the I/O processing by the information processing device according to the third embodiment.

The I/O waiting thread 102 obtains the request fd waiting for a request (step S121).

The I/O waiting thread 102 allocates an area for the function object, and sets a function pointer and a parameter (step S122).

Next, the I/O waiting thread 102 saves its own context in the area of the context storage unit 104 corresponding to the obtained request fd (step S123).

Next, the I/O waiting thread 102 calls the indirect function to execute it using the function object, and writes the request to the request queue 131 (step S124).

Next, the I/O waiting thread 102 switches the running thread 121 to a scheduler thread 111 (step S125).

An I/O completion notification thread 103 regularly polls a response queue 132 (step S221).

Then, the I/O completion notification thread 103 receives I/O completion by obtaining a response from the response queue 132, and identifies the request fd waiting for the request (step S222).

Next, the I/O completion notification thread 103 obtains the context of the I/O waiting thread 102 using the obtained request fd (step S223).

Next, the I/O completion notification thread 103 inserts the I/O waiting thread 102 into a waiting queue 113 using the obtained context (step S224).

The I/O waiting thread 102 is obtained by the thread scheduler 101 from the waiting queue 113, and transitions to the running thread 121, thereby returning to the state of processing execution (step S126).

Thereafter, the I/O waiting thread 102 releases the request fd (step S127).

As described above, the information processing device according to the present embodiment calls an indirect function to write a request to a request queue. As a result, the overhead of the request to the request queue is not applied to a context switch in general in I/O processing, whereby it becomes possible to be limited to the overhead of the context switch. Furthermore, even in the case of the present embodiment, in the information processing device, the I/O waiting thread executes processing in the order of saving the context, writing the request to the request queue, and switching the thread at the time of request issuance. This makes it possible to improve the performance of the I/O processing using the kernel bypass technology while suppressing the abnormality occurrence such as deadlock and ensuring reliability.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
    a request queue that stores a request for IO processing;
    a response queue that stores a response that makes notification of completion of the IO processing;
    an IO device that obtains the request from the request queue, executes the IO processing instructed by the obtained request, and stores the response in the response queue after the completion of the IO processing;
    a first processing unit that writes a request to the request queue after saving context that is information that indicates an operation state of the first processing unit; and
    a second processing unit that polls the response queue, detects storage of the response in the response queue, obtains the response from the response queue, and notifies the first processing unit of the completion of the IO processing.

2. The information processing device according to claim 1, wherein
    the first processing unit resumes operation using the context when the second processing unit outputs notification of the completion of the IO processing.

3. The information processing device according to claim 1, wherein
    the first processing unit saves the context, writes the request to the request queue, and transitions to a state of waiting for the completion of the IO processing.

4. The information processing device according to claim 1, wherein
    the first processing unit saves the context, transitions to a state of waiting for the completion of the IO processing, and writes the request to the request queue.

5. The information processing device according to claim 3, wherein
    the first processing unit uses one function that executes processing of saving the context, processing of writing the request to the request queue, and processing of transitioning to the state of waiting for the completion of the IO processing.

6. The information processing device according to claim 5, wherein
    the function includes a function that complies with application binary interface (ABI) convention.

7. The information processing device according to claim 1, wherein
    the first processing unit calls and executes an indirect function that stores the response to the response queue.

8. A control method for a control program of an information processing device including:
    a request queue that stores a request for IO processing;
    a response queue that stores a response that makes notification of completion of the IO processing; and
    an IO device that obtains the request from the request queue, executes the IO processing instructed by the obtained request, and stores the response in the response queue after the completion of the IO processing, the method comprising:
    causing a first thread to write a request to the request queue after saving context that is information that indicates an operation state of the first thread; and
    causing a second thread to perform a process of polling the response queue, detecting storage of the response in the response queue, obtaining the response from the response queue, and notifying the first thread of the completion of the IO processing.

9. A non-transitory computer-readable storage medium storing a control program for causing an information processing device to perform processing, the information processing device including: a request queue that stores a request for IO processing; a response queue that stores a response that makes notification of completion of the IO processing; and an IO device that obtains the request from the request queue, executes the IO processing instructed by the obtained request, and stores the response in the response queue after the completion of the IO processing, the processing comprising:
    causing a first thread to write a request to the request queue after saving context that is information that indicates an operation state of the first thread; and
    causing a second thread to perform a process of polling the response queue, detecting storage of the response in the response queue, obtaining the response from the response queue, and notifying the first thread of the completion of the IO processing.

* * * * *